(12) United States Patent
Sun et al.

(10) Patent No.: US 11,146,502 B2
(45) Date of Patent: Oct. 12, 2021

(54) METHOD AND APPARATUS FOR ALLOCATING RESOURCE

(71) Applicant: BEIJING BAIDU NETCOM SCIENCE AND TECHNOLOGY CO., LTD., Beijing (CN)

(72) Inventors: Fangyuan Sun, Beijing (CN); Jinlin Wu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/721,486

(22) Filed: Dec. 19, 2019

(65) Prior Publication Data
US 2020/0328984 A1 Oct. 15, 2020

(30) Foreign Application Priority Data
Apr. 11, 2019 (CN) .......................... 201910289283.9

(51) Int. Cl.
*G06F 15/173* (2006.01)
*H04L 12/927* (2013.01)
(Continued)

(52) U.S. Cl.
CPC .......... *H04L 47/805* (2013.01); *H04L 47/762* (2013.01); *H04L 47/781* (2013.01);
(Continued)

(58) Field of Classification Search
CPC ... H04L 47/762; H04L 47/805; H04L 47/781; H04L 47/808; H04L 47/823; H04L 47/826
See application file for complete search history.

(56) References Cited

U.S. PATENT DOCUMENTS

| 2016/0072766 A1* | 3/2016 | Jain ..................... H04L 61/2532 709/228 |
| 2017/0272379 A1* | 9/2017 | McClean ................ H04L 41/22 |
| 2018/0167288 A1* | 6/2018 | Mogaki ................... H04L 43/04 |

FOREIGN PATENT DOCUMENTS

| CN | 103501347 A | 1/2014 |
| CN | 104717247 A | 6/2015 |

(Continued)

OTHER PUBLICATIONS

Qi et al., "Implementation of User Disk Quota in Distributed Storage System," Journal of Computer Research and Development, 2012, 6 pages.
(Continued)

*Primary Examiner* — Yves Dalencourt
(74) *Attorney, Agent, or Firm* — Seed IP Law Group LLP

(57) ABSTRACT

A method and an apparatus for allocating a resource are provided according to the embodiments. The method may include: extracting a resource category matching a target subserver and a required quota corresponding to the resource category from a request sent by a client side; determining a number of subservers is a subserver group receiving the request; determining a globally available quota and a total limit matching the resource category; determining a limit matching the resource category in the target subserver based on the total limit and the number of subservers; and performing resource allocation for a resource quantity corresponding to the required quota of the request based on a comparison between the required quota and the limit of the target subserver. The embodiment achieves reducing the number of applications for the globally available quota, thus accelerating processing the request by the server.

17 Claims, 9 Drawing Sheets

(51) Int. Cl.
*H04L 12/923* (2013.01)
*H04L 12/911* (2013.01)
(52) U.S. Cl.
CPC .......... *H04L 47/808* (2013.01); *H04L 47/823* (2013.01); *H04L 47/826* (2013.01)

(56) References Cited

FOREIGN PATENT DOCUMENTS

| CN | 105808341 A | 7/2016 |
|----|-------------|--------|
| CN | 106101232 A | 11/2016 |
| CN | 108228346 A | 6/2018 |
| CN | 109189568 A | 1/2019 |
| JP | 2007-122664 A | 5/2007 |
| JP | 2009-140079 A | 6/2009 |
| JP | 2018-97837 A | 6/2018 |

OTHER PUBLICATIONS

"Data Storage and Management Based on Cloud Computing Environment" with English abstract, May 6, 2013, pp. 1-45.
Japanese Office Action, dated Jun. 3, 2021, for Japanese Patent Application No. 2019-227531. (4 pages).

* cited by examiner

METHOD AND APPARATUS FOR ALLOCATING RESOURCE

CROSS-REFERENCE TO RELATED APPLICATIONS

This application claims priority to Chinese Patent Application No. 201910289283.9, filed on Apr. 11, 2019, titled "Method and Apparatus for Allocating Resource," which is hereby incorporated by reference in its entirety.

TECHNICAL FIELD

Embodiments of the present disclosure relate to the field of computer technology, and particularly to a method and apparatus for allocating a resource.

BACKGROUND

In the field of computer, quota is a mechanism of tracking and controlling resource consumption by each entity on a node, to prevent excessive resource consumption, whilst performing statistics and reporting of resource allocations. For example, the resource may include a disk space, a memory, a CPU, and the like. The entity may, for example, include an individual user, an organization, a process, and so on.

In related technologies, the quota during resource allocation is generally determined using the following schemes: single machine quota management, which includes continuously deducting the amount of a locally available quota, and directly declining a request if the locally available quota is not enough, i.e., initializing the locally available quota, deducting the quota by a needed amount when receiving a request each time, and then determining whether the current locally available quota is greater than 0; and a globally available quota deduction mechanism, which is employed in a distributed system, and includes deducting a quota in a global memory (commonly a centralized cache) for each request, then determining whether the quota is available, approving the request if the remaining quota is enough, and declining the request if the remaining quota are not enough.

SUMMARY

Embodiments of the present disclosure provide a method and an apparatus for allocating a resource.

In a first aspect, the embodiments of the disclosure provides a method for allocating a resource, which includes: extracting a resource category matching a target subserver and a required quota corresponding to the resource category from a request sent by a client side; determining a number of subservers in a subserver group receiving the request; determining a globally available quota and a total limit matching the resource category; determining a limit matching the resource category in the target subserver based on the total limit and the number of subservers; and performing resource allocation for a resource quantity corresponding to the required quota of the request based on a comparison between the required quota and the limit of the target subserver.

In some embodiments, the performing resource allocation for a resource quantity corresponding to the required quota of the request based on a comparison between the required quota and the limit of the target subserver includes: allocating, in response to the required quota being smaller than or equal to the limit of the target subserver, the resource quantity corresponding to the required quota of the request from a resource quantity corresponding to the limit of the target subserver.

In some embodiments, after the allocating the resource quantity corresponding to the required quota of the request from a resource quantity corresponding to the limit, the method further includes: regularly receiving a remaining limit sent by the target subserver after the required quota allocated; allocating the resource quantity corresponding to the required quota from a resource quantity corresponding to the globally available quota, to supplement a resource quantity corresponding to the remaining limit in the target subserver.

In some embodiments, the performing resource allocation for a resource quantity corresponding to the required quota of the request based on a comparison between the required quota and the limit of the target subserver includes: allocating, in response to the required quota being greater than the limit of the target server, the resource quantity corresponding to the required quota of the request from the target, subserver; and recording the required quota in the target subserver.

In some embodiments, after the recording the required quota in the target subserver, the method further includes: receiving the recorded required quota sent by the target subserver; receiving a next request sent by the client side; and deducting, in response to receiving the next request, a resource quantity corresponding to the recorded required quota from the resource quantity corresponding to the globally available quota.

In some embodiments, after the recording the required quota in the target subserver, the method further includes: timing a record cycle; receiving the recorded required quota sent by the target subserver; and deducting, in response to the record cycle reaching a preset duration, the resource quantity corresponding to the required quota from the resource quantity corresponding to the globally available quota.

In some embodiments, the method further includes: determining whether a current remaining quota of the globally available quota is smaller than the limit of the target subserver; and updating, in response to determining the current remaining quota of the globally available quota being smaller than the limit of the target subserver, a quota corresponding to the limit of the target subserver as the current remaining quota of the globally available quota.

In a second aspect, the embodiments of the present disclosure provides a method for allocating a resource, including: receiving a request sent by a client side, the request including: a resource category and a total required quota matching the resource category; executing following determining steps on the total required quota matching the resource category in the request: determining a globally available quota and a total limit matching the resource category in the request; determining whether the globally available quota is greater than a preset value; summing the globally available quota and the total limit, in response to determining the globally available quota being greater than the preset value, to obtain a total quota; determining whether the total required quota is smaller than or equal to the total quota; and determining, in response to determining the total required quota being smaller than or equal to the total quota, the total required quota corresponding to the resource category satisfying a resource allocation condition; executing the determining steps on a total required quota corresponding to each resource category in the request, to determine whether the total required quota corresponding to the each resource category satisfies the resource allocation condition respectively; and generating, in response to determining the total required quota corresponding to each resource category satisfying the resource allocation condition respectively, indication information for characterizing to approve the request, and performing resource allocation on the each resource category of the request respectively using the method according to any one of claims 1-7.

In some embodiments, the method further includes: generating, in response to determining a total required quota corresponding to any resource category in the request failing to satisfy the resource allocation condition, indication information for characterizing to intercept the request.

In a third aspect, the embodiments of the present disclosure provides an apparatus for allocating a resource, including: an information extracting unit configured to extract a resource category matching a target subserver and a required quota corresponding to the resource category from a request sent by a client side; a first processing unit configured to determine a number of subservers in a subserver group receiving the request; a second processing unit configured to determine a globally available quota and a total limit matching the resource category; a limit determining unit configured to determine a limit matching the resource category in the target subserver based on the total limit and the number of subservers; and a resource allocation processing unit configured to perform resource allocation for a resource quantity corresponding to the required quota of the request based on a comparison between the required quota and the limit of the target subserver.

In some embodiments, the resource allocation processing unit is further configured to: allocate, in response to the required quota being smaller than or equal to the limit of the target subserver, the resource quantity corresponding to the required quota of the request from a resource quantity corresponding to the limit of the target subserver.

In some embodiments, the resource allocation processing unit, further includes a receiving module configured to regularly receive a remaining limit sent by the target subserver after the required quota is allocated;

and a resource allocating module configured to allocate the resource quantity corresponding to the required quota from a resource quantity corresponding to the globally available quota, to supplement a resource quantity corresponding to the remaining limit in the target subserver.

In some embodiments, the resource allocation processing unit includes: a second resource allocating module configured to allocate, in response to the required quota being greater than the limit of the target server, the resource quantity corresponding to the required quota for the request from the target subserver; and a recording module configured to record the required quota in the target subserver.

In some embodiments, the apparatus further includes: a first information receiving unit configured to receive the recorded required quota sent by the target subserver; a first request receiving unit configured to receive a next request sent by the client side; and a third processing unit configured to deduct, in response to receiving the next request, a resource quantity corresponding to the recorded required quota from the resource quantity corresponding to the globally available quota.

In some embodiments, the apparatus further includes: a timing unit configured to time a record cycle; a second information receiving unit configured to receive the recorded required quota sent by the target subserver; and a fourth processing unit configured to deduct, in response to the record cycle reaching a preset duration, the resource quantity corresponding to the required quota from the resource quantity corresponding to the globally available quota.

In some embodiments, the apparatus further includes: a comparing unit configured to determine whether a current remaining quota of the globally available quota is smaller than the limit of the target subserver; and a quota updating unit configured to update, in response to determining the current remaining quota of the globally available quota being smaller than the limit of the target subserver, a quota corresponding to the limit of the target subserver as the current remaining quota of the globally available quota.

In a fourth aspect, the embodiments of the present disclosure provides an apparatus for allocating a resource, the apparatus including: a second request receiving unit configured to receive a request sent by a client side, the request including: a resource category and a total required quota matching the resource category; a required quota determining unit configured to execute following determining steps on the total required quota matching the resource category in the request: determining a globally available quota and a total limit matching the resource category information in the request; determining whether the globally available quota is greater than a preset value; summing the globally available quota and the total limit, in response to determining the globally available quota being greater than the preset value, to obtain a total quota; determining whether the total required quota is smaller than or equal to the total quota; and determining, in response to determining the total required quota being smaller than or equal to the total quota, the total required quota corresponding to the resource category satisfying a resource allocation condition; a determining step executing unit configured to execute the determining steps on a total required quota corresponding to each resource category in the request, to determine whether the total required quota corresponding to the each resource category satisfies the resource allocation condition respectively; and a fifth processing unit configured to generate, in response to determining the total required quota corresponding to each resource category satisfying the resource allocation condition respectively, indication information for characterizing to approve the request, and perform resource allocation on the each resource category of the request respectively using the method according the first aspect or any embodiment of the first aspect.

In some embodiments, the apparatus further includes an indication information generating unit configured to generate, in response to determining a total required quota corresponding to any resource category in the request failing to satisfy the resource allocation condition, indication information for characterizing to intercept the request.

Tn a fifth aspect, the embodiments of the present disclosure provides an electronic device, which includes: one or more processors; a storage apparatus, storing one or more programs thereon; where the one or more programs, when executed by the one or more processors, cause the one or more processors to implement the method according to the first aspect or any embodiment of the first aspect or the method according to the second aspect or any embodiment of the second aspect.

In a sixth aspect, the embodiments of the present disclosure provide a computer readable medium storing a computer program thereon, where the program, when executed by a processor, implements the method according to the first aspect or any embodiment of the first aspect or the method according to the second aspect or any embodiment of the second aspect.

The method and apparatus for allocating a resource according to the embodiments or the present disclosure extract a resource category matching a target subserver and a required quota corresponding to the resource category from a request sent by a client side, determine a number of subservers in a subserver group receiving the request, determine a globally available quota and a total limit matching the resource category, determine a limit matching the resource category in the target subserver based on the total limit and the number of subservers, and perform resource allocation for a resource quantity corresponding to the required quota of the request based on a comparison between the required quota and the limit of the target subserver. Since the quota of the target sub server is determined based on the total quota and the number of subservers, the determined quotas can be understood as the local available quota of the target sub server. Then, based on the comparison of required quota and the quota, the resource allocation operation is carried out for the request according to the resource amount corresponding to required quota, so as to allocate the resource quota reasonably and utilize the server resources reasonably in the distributed environment. In addition, with the allocation of local available quota to the target subserver and reasonable set of resource quota, the number of applications to the global available quota can be reduced, so as to speed up the processing of requests by the server.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that some embodiments in the present disclosure and some features in the disclosure may be combined with each other on a non-conflict basis. The present disclosure will be described below in detail with reference to the accompanying drawings and in combination with embodiments.

Figure 1:
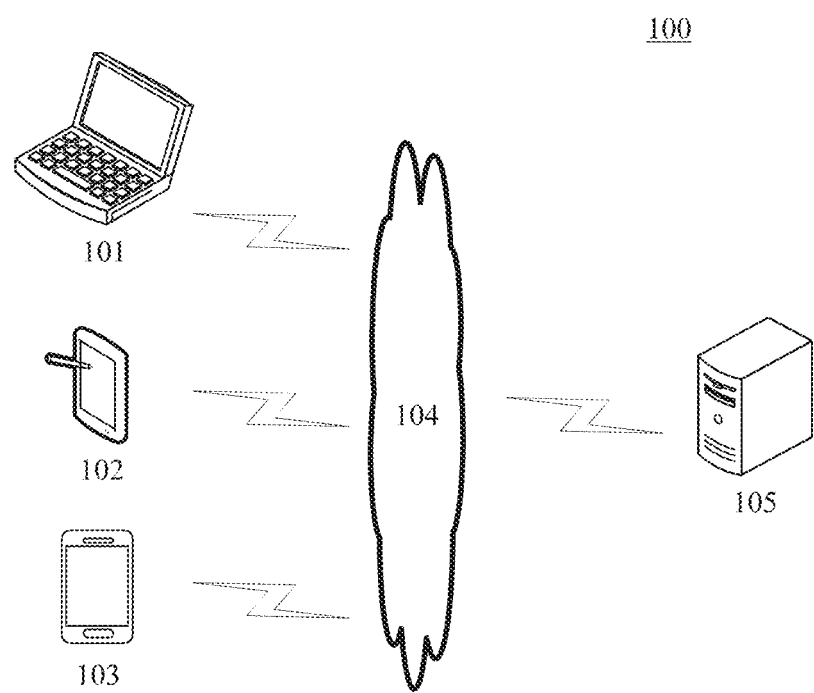
FIG. 1 is a diagram of an example system architecture in which an embodiment of the present disclosure may be implemented.

FIG. 1 shows an example architecture 100 in which a method for allocating a resource or an apparatus for allocating a resource of embodiments of the present disclosure may be implemented.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless communication links, or optical cables.

The terminal devices 101, 102, and 103 interact with the server 105 via the network 104, for example, to receive or send a message. The terminal devices 101, 102, and 103 may be provided with various communication client applications, such a shopping application, a search application, an instant messaging tool, an email client, social platform software, a text editing application, a browser application, and a reading application.

The terminal devices 101, 102, and 103 may be hardware or software. When the terminal devices 101, 102 and 103 are hardware, the terminal devices may be various electronic devices having a display screen and supporting sending a request to the server, including but not limited to a smart phone, a tablet computer, an e-book reader, an MP3 (Moving Picture Experts Group Audio Layer III) player, an MP4 (Moving Picture Experts Group Audio Layer IV) player, a laptop portable computer, a desktop computer, and the like. When the terminal devices 101, 102, and 103 are software, the terminal devices may be installed in the above-listed electronic devices, or be implemented as a plurality of software programs or software modules (e.g., software programs or software modules for providing distributed services), or as a single software program or software module. The terminal devices 101, 102, and 103 are not specifically limited here.

The server 105 may be a server providing various services, such as a back-end server receiving a request sent by the terminal devices 101, 102, and 103. The back-end server may process, e.g., perform resource allocation on, the request sent by a client side.

It should be noted that a server side and the client side may be hardware or software. When the server side and the client side are hardware, the server side and the client side may be implemented as a distributed server cluster composed of a plurality of servers, or be implemented as a single server. When the server side and the client side are software, the server side and the client side may be implemented as a plurality of software programs or software modules (e.g., software programs or software modules for providing distributed services), or may be implemented as a single software program or software module. The server side and the client side are not specifically limited here.

It should be noted that the method for allocating a resource according to some embodiments of the present disclosure is generally executed by the server 105. Accordingly, the apparatus for allocating a resource is generally provided in the server 105.

It should be understood that the numbers of terminal devices, networks, and servers in FIG. 1 are merely illustrative. Any number of terminal devices, networks, and servers may be provided based on actual requirements.

Figure 2:
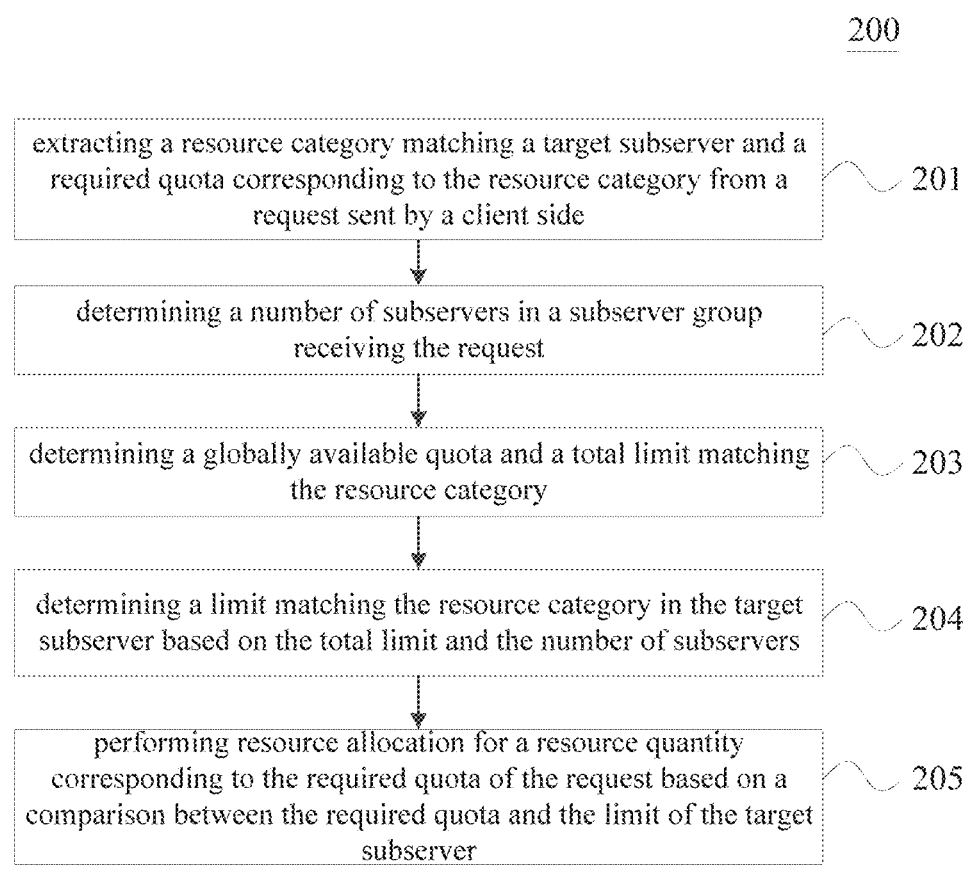
FIG. 2 is a flowchart of a method for allocating a resource according to an embodiment of the present disclosure.

Further referring to FIG. 2, a process 200 of a method for allocating a resource according to an embodiment of the present disclosure is shown. The method for allocating a resource is applied to a server, and includes the following steps 201 to 205.

Step 201: extracting a resource category matching a target subserver and a required quota corresponding to the resource category from a request sent by a client side.

In the present embodiment, an executing body (e.g., the server 105 shown in FIG. 1) of the method for allocating a resource may extract the resource category matching the target subserver and the required quota corresponding to the resource category from the request sent by the client side.

Examples of the resource may be a disk space, or a memory, or a CPU. Here, the resource category refers to a kind of resource, such as the disk space. The required quota corresponding to the resource category, e.g., may be a required quota 2 MB corresponding to the resource category (disk space) on a subserver, i.e., the request needs a resource quota 2 MB of the disk space on the subserver. In a distributed environment, corresponding to the request, a plurality of subservers may be required to receive the request, and then cooperate in completing the request. For example, a target subserver may be understood as a subserver, on which the server performs the method for allocating a resource, of these subservers. It should be understood that the above examples are merely intended to better explain the method for allocating a resource according to the present embodiment, and should not be construed as limiting the present embodiment.

Step 202: determining a number of subservers in a subserver group receiving the request.

In the present embodiment, the executing body may determine the number of subservers in the subserver group receiving the request. Here, the subserver group may be understood as a subserver group composed of the plurality of subservers receiving the request in the distributed environment.

As an example, the client side sends a request for downloading a document to the server. All subservers in the subserver group receive the request. For example, a memory resource of a first subserver required by the request is 2 GB, a memory resource of a second server required by the request 5 GB, and a memory resource of a third server required by the request is 3 GB (for illustration only, not as a limitation). Then, the server may know that among the subservers, the number of subservers receiving the request is 3 accordingly.

Step 203: determining a globally available quota and a total limit matching the resource category.

In the present embodiment, the executing body may further determine the globally available quota and the total limit matching the resource category. The globally available quota may be understood as an available quota specified by the server for resources of the resource category, i.e., the amount of available resources under a normal circumstance. The total limit (burst) may be understood as an available capacity specified by the server for resources of the resource category, i.e., a maximum limit of exceeding the quota of the resource category.

As an example, for a memory resource in the request, for instance, the server may specify that the globally available quota of the resource is 100 GB. The total limit (burst) specified by the server for the memory resource may be 20 GB.

Step 204: determining a limit matching the resource category in the target subserver based on the total limit and the number of subservers.

In the present embodiment, the executing body may determine the limit matching the resource category in the target subserver after acquiring the total limit and the number of subservers. For example, the total limit of the resource category is 20 (here, the number is described by way of example, without limiting the category of resource). For example, the number of subservers is 3.

As an example, the server may round a quotient obtained by dividing the total limit 20 by the number 3 of subservers, to obtain 6 as the limit matching the resource category in the target subserver. As another example, the server may allocate the total limit 20. For example, the limit matching the resource category and allocated by the server to the first subserver is 10, the limit matching the resource category and allocated to the second subserver is 5, and the limit matching the resource category and allocated to the third subserver is 5. Assuming that the first subserver here is the target subserver, then the limit matching the resource category in the target subserver is 10.

Step 205: performing resource allocation for a resource quantity corresponding to the required quota of the request based on a comparison between the required quota and the limit of the target subserver.

In the present embodiment, after acquiring the limit matching the resource category in the target subserver, the executing body may compare the required quota and the limit corresponding to the resource category in the request, to obtain the comparison result, and then resource allocation for a resource quantity corresponding to the required quota of the request based on the comparison result, such that the globally available quota is used in combination with the locally available quota (limit) of the subserver, thus reducing the number of requests for the globally available quota.

As an example, in some alternative implementations of the present embodiment, in response to the required quota being smaller than or equal to the limit, the executing body may allocate the resource quantity corresponding to the required quota for the request from a resource quantity corresponding to the limit. For example, for the target subserver, the limit is 6, while the required quota corresponding to the resource category is 3, and then the executing body may directly allocate the required quota 3 from the limit in the target subserver. That is, the target subserver may allocate resources from a locally available resource quota to satisfy the resource quota request without the need of applying for the globally available quota in the server, thereby quickly responding to the request, and accelerating the processing speed of the request by a processor.

After allocating the resource quantity corresponding to the required quota for the request from the resource quantity corresponding to the limit, in some alternative implementations of the present embodiment, the executing body may further regularly receive a remaining limit sent by the target subserver after allocating resources to the request. Then, the server may allocate the resource quantity corresponding to the required quota from a resource quantity corresponding to the globally available quota, to supplement a resource quantity corresponding to the remaining limit in the target subserver. For example, the initial limit corresponding to resources of the resource category in the target subserver is 6, i.e., the locally available quota is 6. However, the required quota corresponding the resource category in the request is 3. After deducting 3 from the locally available quota of the target subserver, the remaining limit is 6−3=3. Then, the target subserver regularly reports the remaining limit to the server. The server may allocate the resource quantity corresponding to the required quota 3 from the resource quantity corresponding to the globally available quota, to supplement the target subserver, such that the limit of the target subserver is still the initial value 6.

Figure 3:
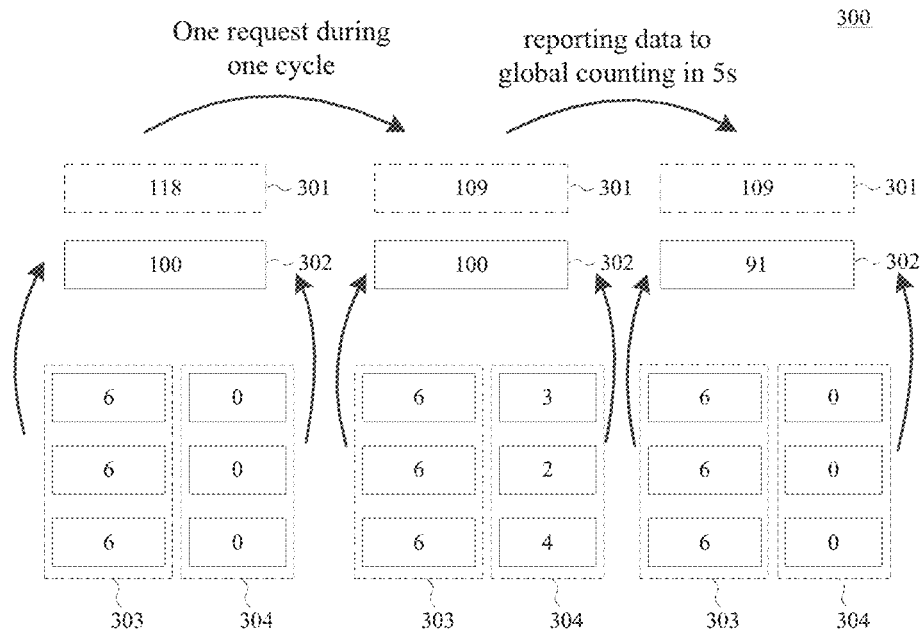
FIG. 3 is a schematic diagram of an application scenario of the method for allocating a resource according to an embodiment of the present disclosure.

For example, in an application scenario shown in FIG. 3, locally available quotas of three subservers are each 6 (limit 303). Initially, no request is received, i.e., local counted numbers 304 are each 0. In this case, assuming that a globally available quota 302 is 100, then a current total available quota 301 is 100+3×6=118.

Then, after receiving one request during one cycle, for the resource type, required quotas corresponding to the three subservers are 3, 2, and 4 respectively. In this case, the required quotas are first locally counted, i.e., for the three subservers, the local counted numbers 304 are 2, and 4 respectively.

The required quotas 3, 2, and 4 are each smaller than a limit 6. Therefore, resource quotas corresponding to the required quotas may be directly deducted from the locally available quotas (limit 303). After the deduction, remaining locally available quotas for the three subservers are 6−3=3, 6−2=4, 6−4=2 respectively.

Then, local counted numbers are reported to a server in 5 s, and the server deducts the quotas 3, 2, and 4 from the globally available quota 100 to supplement to the three subservers, i.e., supplement the limit 303 of the subservers, such that the limit reaches an initial limit 6. In this case, a remaining globally available quota is 100−3−2−4=91.

As another example, in some alternative implementations of the present embodiment, in response to the required quota being greater than the limit, the executing body may allocate the resource quantity corresponding to the required quota for the request from the target subserver. Then, the server records the required quota in the target subserver. Specifically, when the required quota of the request is greater than the locally available quota (limit), then the server may first allocate the resource quantity corresponding to the required quota from the target subserver, to ensure the user experience of a client-side user. Then, the server may record the required quota of the resource of the request in the target subserver, i.e., the local counting.

Then, as an example, the target subserver may upload the recorded local counted number to the server. The server receives the recorded required quota. Then, when receiving a next request sent by the client side, the server may deduct a resource quantity corresponding to the recorded required quota from the resource quantity corresponding to the globally available quota. As another example, the server times a record cycle after locally recording the required quota. Then, the server determines whether the record cycle reaches a preset duration, after receiving the recorded required quota sent by the target subserver. In response to the record cycle reaching the preset duration, the server may deduct the resource quantity corresponding to the required quota from the resource quantity corresponding to the globally available quota.

Figure 4:
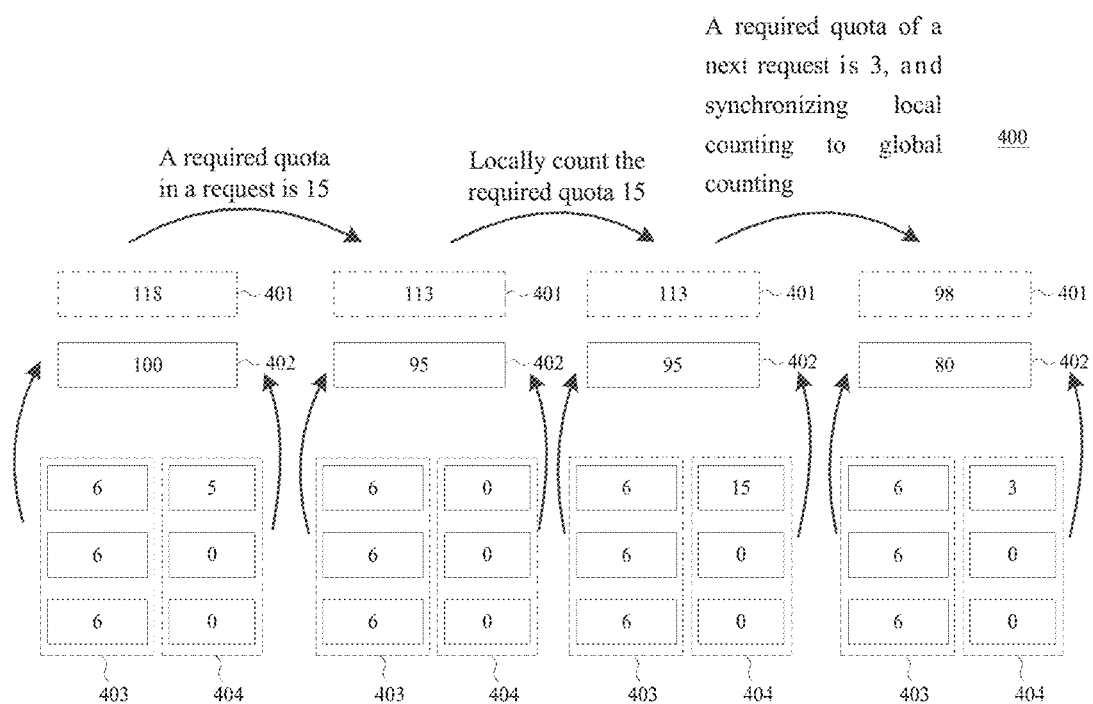
FIG. 4 is a schematic diagram of another application scenario of the method for allocating a resource according to an embodiment of the present disclosure.

For example, in an application scenario shown in FIG. 4, locally available quotas of three subservers are each 6 (limit 403). A local counted number 404 of a first subserver is initially 5 (showing that a resource quota of a first subserver used in a last request is 5), and local counted numbers of a second subserver and a third subserver are each 0. In this case, assuming that a globally available quota 402 is 100, then a current total available quota 401 is 100+3×6=118.

Then, in the received request, a required quota of the first subserver is 15, and required quotas of the other two subservers are 0. In this case, the first subserver first reports local counted number 5 to the globally available quota 402 for deduction. Then, remaining globally available quota corresponding to the resource in the server is 100−5=95.

Then, the server records a required quota 15 of the request in a local counted number of a target subserver, i.e., for the three subservers, the local counted numbers 304 are 15, 0, and 0 respectively. Here, it should be noted that whilst locally counting the required quota 15, the resource quota is first deducted from the target subserver for use by a user, so as not to affect the rights and interests of a client-side user.

Then, when the server receives a next request, last local counted number 15 may be deducted from the globally available quota 402 in this case, the remaining globally available quota is 95−15=80. Then, a required quota 3 of the next request is recorded in the local counted number, and a corresponding resource allocation strategy is used for resource allocation.

In the above two implementations of the present embodiment, the first implementation continuously updates the locally available quota, preferentially uses the locally available quota, and reduces a requesting workload on the globally available quota, thereby ensuring the performance of processing the request by the server. In the second implementation, even in the case where the locally available quota does not meet the required quota, providing the required quota for the user request is not affected, and the globally available quota can also be synchronized in time, thereby improving the flexibility of processing the requests by the server.

In some alternative implementations of the present embodiment, in order to prevent the resource quota from being excessively wasted, the executing body may further determine whether a current remaining quota of the globally available quota is smaller than the limit. In response to determining the current remaining quota of the globally available quota being smaller than the limit, a quota corresponding to the is updated as the current remaining quota of the globally available quota.

Specifically, at present, final remaining resource quota is wasted in most resource allocation methods. In order to ensure that the available resources of the user are reasonably used, and are not excessively wasted, in the alternative implementation, the executing body may set the limit of the resource allowed to exceed the quota in each subserver as a total limit/subserver number.

Figure 5:
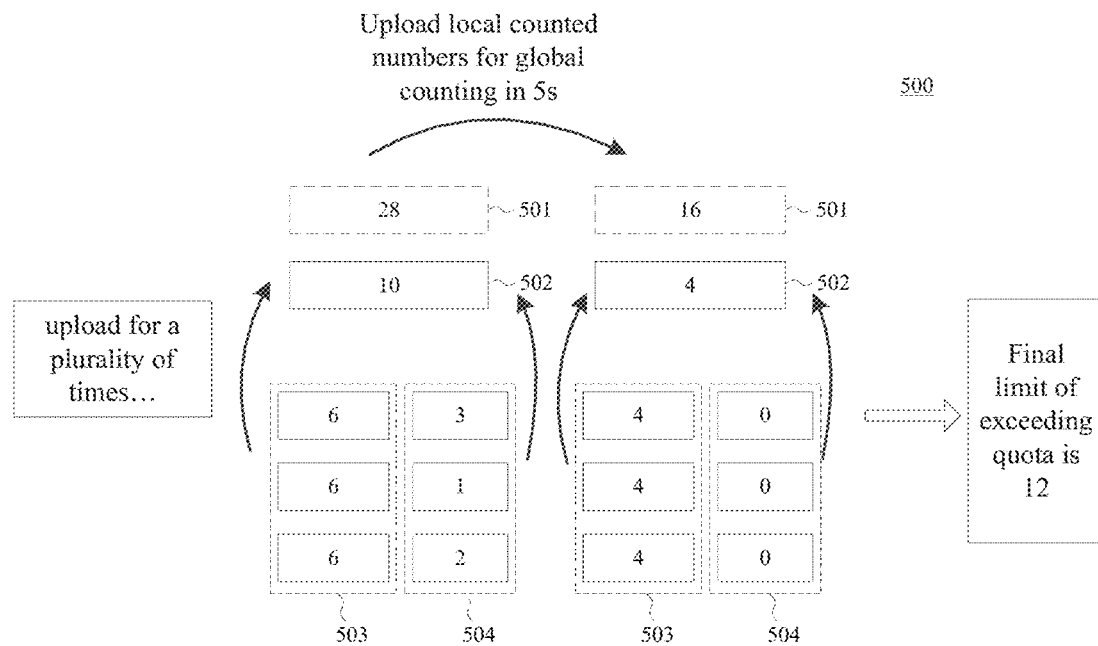
FIG. 5 is a schematic diagram of still another application scenario of the method for allocating a resource according to an embodiment of the present disclosure.

For example, in an application scenario shown in FIG. 5, a limit 503 of each subserver assumed to be 6. After requesting data synchronization many times, a globally available quota 502 is 10. In this case, a total quantity 501 of available quotas is 10+3×6=28.

In this request, required quotas (local counted numbers 504) corresponding to three subservers are 3, 1, and 2 respectively. Then, 5 s later, local counted numbers are uploaded to the server for global counting, quotas corresponding to the required quotas are deducted from the globally available quota 502 to supplement to limits of the three subservers, and then a remaining quota of the globally available quota 502 is 10−3−1−2=4.

In this case, the remaining quota of the globally available quota 502 is 4, which is smaller than the limit 6 of the three subservers. Thus, in this case, the executing body may update the limit 503 of the subservers to 4. In this way, a final limit of the required quotas of the resource of the request exceeding the quota is 4×3=12. Thus, the quota resource is reasonably used, thereby ensuring that not only the resource quota is not excessively wasted, but also the performance of processing the request by the server is not be affected.

Figure 6:
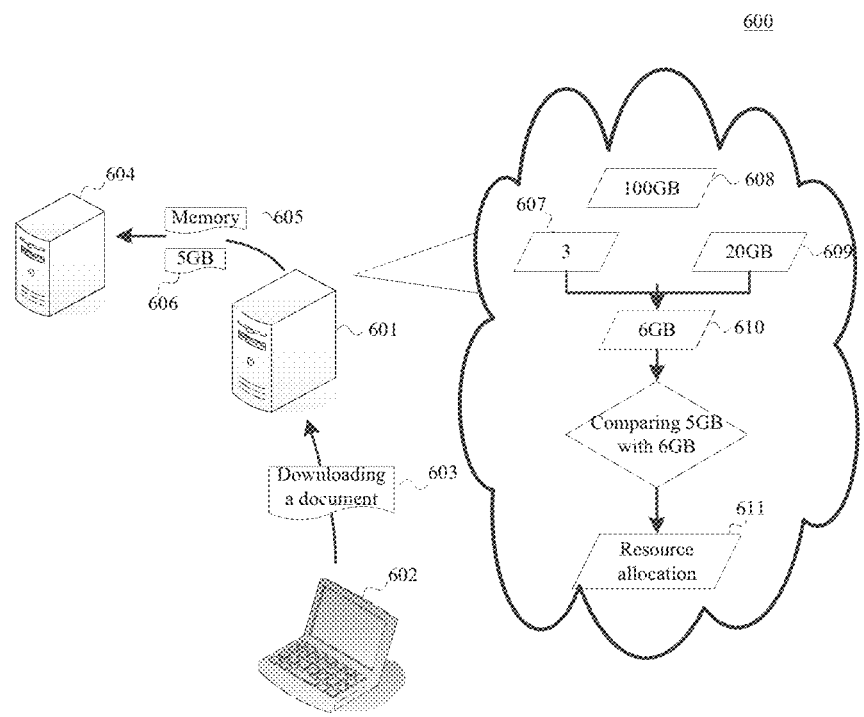
FIG. 6 is a schematic diagram of an application scenario of the method for allocating a resource according to the embodiment shown in FIG. 2 of the present disclosure.

Further referring to FIG. 6, FIG. 6 is a schematic diagram of an application scenario of the method for allocating a resource according to the embodiment shown in FIG. 2 of the present disclosure. In the application scenario of FIG. 6, the server 601 extracts a resource category 605 (memory resource) matching a target subserver 604 and a required quota 606 (5 GB) corresponding to the resource category 605 from a request 603 (downloading a document) sent by a client side 602.

Then, the server 601 determines the number 607 of subservers in a subserver group receiving the request being 3, a globally available quota 608 matching the memory resource being 100 GB, and a total limit 609 being 20 GB. The server 601 equally divides 20 GB into three subservers. Therefore, a limit 610 of a target subserver is 6 GB.

Then, the server 601 compares the required quota 5 GB and the limit 6 GB, and performs resource allocation 611 based on a comparison result. For example, the server 601 determines the required quota 5 GB being smaller than the limit 6 GB, and may allocate a resource quantity corresponding to a memory resource required quota 5 GB in the request from a resource quantity corresponding to a locally available quota (limit 610) of the target subserver, for use by the request of a client side.

At present, in the existing technology, the required quota generally deducts from the globally available quota when receiving a request each time, thereby increasing a requesting workload of requesting from the globally available quota, and resulting in a low processing speed of the server. The method according to the above embodiments of the present disclosure determines the limits of the target subserver based on the total limit and the number of subservers. Thus, these limits may be understood as the locally available quotas of the target subservers. Then, based on comparison between the required quota and the limit, resource allocation is performed on the request for a resource quantity corresponding to the required quota, thereby reasonably allocating the resource quota and reasonably utilizing the server resources in a distributed environment. Allocating the locally available quota to the target subserver and reasonably setting the resource quota may reduce the number of applications for the globally available quota, thus accelerating processing the request by the server.

Figure 7:
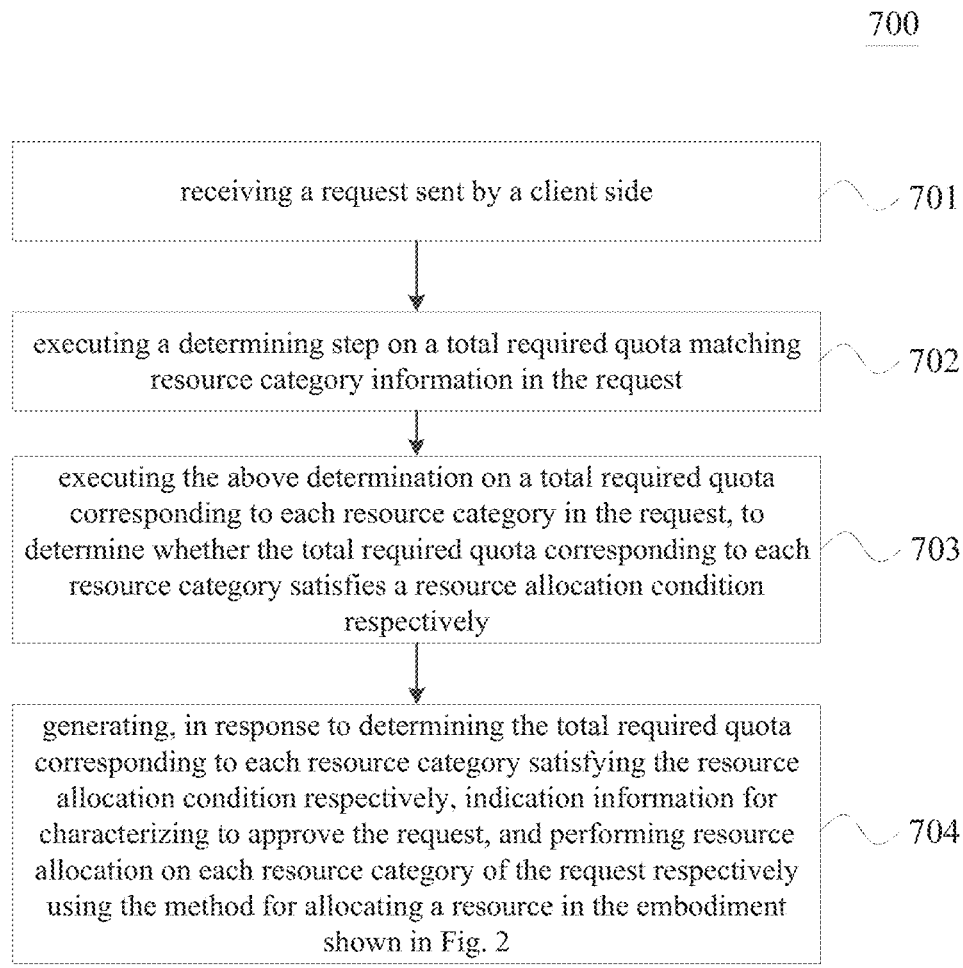
FIG. 7 is a flowchart of a method for allocating a resource according to another embodiment of the present disclosure.

Further referring to FIG. 7, a process 700 of the method for allocating a resource according to another embodiment of the present disclosure is shown. The process 700 of the method for allocating a resource is applied to a server, and includes the following steps 701 to 704.

Step 701: receiving a request sent by a client side.

In the present embodiment, an executing body (e.g., the server 105 shown in FIG. 1) of the method for allocating a resource may receive the request sent by the client side. The request includes: resource category information and a total required quota matching the resource category information. The resource category information here may include a memory. The total required quota here refers to a requested resource quota for a kind of resource, no matter how many subservers receive the request.

Step 702: executing a determining step on a total required quota matching resource category information in the request.

Figure 8:
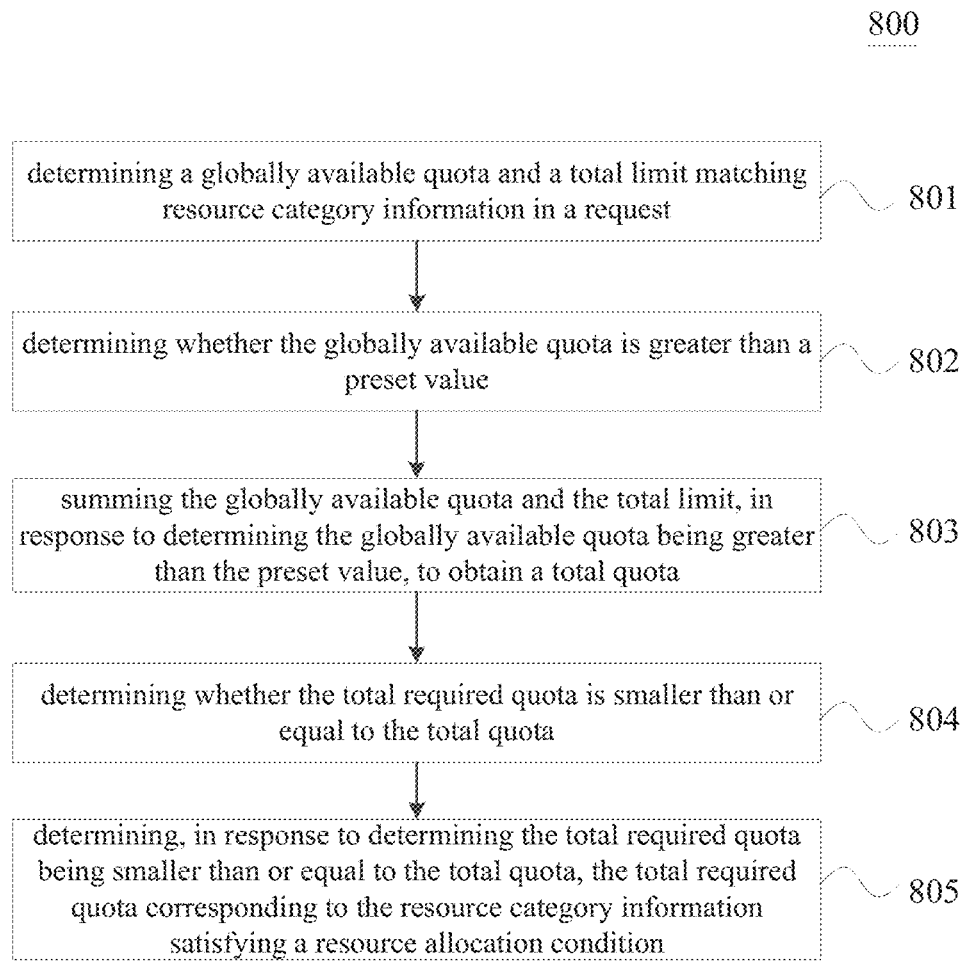
FIG. 8 is a flowchart of a determining step according to the embodiment shown in FIG. 7 of the present disclosure.

In the present embodiment, the executing body may execute a determining step 800 on the total required quota matching the resource category information in the request. Specifically, as shown in FIG. 8, the determining step 800 may include:

Step 801: determining a globally available quota and a total limit matching resource category information in a request.

In the present embodiment, the executing body may determine the globally available quota and the total limit matching the resource category information in the request after receiving a request sent by a client side.

For each kind of resource, such as a memory resource, the server pre-allocates a global resource quota of the resource and a limit allowed to exceed the quota. Here, the global resource quota may be understood as the globally available quota. The limit allowed to exceed the quota may be understood as the total limit.

Step 802: determining whether the globally available quota is greater than a preset value.

In the present embodiment, the executing body may compare the globally available quota and the preset value after determining the globally available quota and the total limit matching the resource category information, and then determine whether the globally available quota is greater than the preset value. As an example, the preset value here may be, for example, 0. The server may determine whether the globally available quota is greater than 0.

Step 803: summing the globally available quota and the total limit, in response to determining the globally available quota being greater than the preset value, to obtain a total quota.

In the present embodiment, the executing body may sum the globally available quota and the total limit, after determining the globally available quota being greater than the preset value, to obtain the total quota. As an example, a memory resource quota required in the request is, for example, 80 GB. However, a globally available quota of the memory resource is 100 GB, and a total limit of the memory resource is 20 GB. Then, the server may sum the globally available quota 100 GB and the total limit 20 GB of the memory resource, to obtain the total quota of the memory resource being 120 GB.

Step 804: determining whether the total required quota is smaller than or equal to the total quota.

In the present embodiment, the executing body may compare the required quota with the total quota of the resource after obtaining the total quota of resources of the category, to determine whether the required quota is smaller than or equal to the total quota.

As an example, for instance, the total quota of the memory resource is 120 GB, and the required quota of the memory resource is 80 GB. The server compares the required quota 80 GB with the total quota 120 GB, and obtains a result that the required quota is smaller than the total quota.

Step 805: determining, in response to determining the total required quota being smaller than or equal to the total quota, the total required quota corresponding to the resource category information satisfying a resource allocation condition.

In the present embodiment, in the case where the required quota is smaller than or equal to the total quota, the executing body may determine the total required quota corresponding to the resource category information satisfying the resource allocation condition.

That is, only when the globally available quota is greater than the preset value, and the required quota is smaller than or equal to the total quota, does the required quota corresponding to the resource category information satisfy the resource allocation condition. Otherwise, the required quota corresponding to the resource category information does not satisfy the resource allocation condition.

Step 703: executing the above determination on a total required quota corresponding to each resource category in the request, to determine whether the total required quota corresponding to each resource category satisfies a resource allocation condition respectively.

In the present embodiment, the request may include information of a plurality of resource categories, for example, may include a memory resource, a disk space, and so on. Therefore, the executing body may execute the above determining step 800 on the total required quota corresponding to each resource category in the request.

Here, it should be noted that the total required quotas matching resource categories may be different, and thus it is necessary to execute the above determining step 800 respectively for each total required quota, to determine whether each total required quota satisfies the resource allocation condition.

Step 704: generating, in response to determining the total required quota corresponding to each resource category satisfying the resource allocation condition respectively, indication information for characterizing to approve the request, and performing resource allocation on each resource category of the request respectively using the method for allocating a resource in the embodiment shown in FIG. 2.

In the present embodiment, when determining each total required quota corresponding to each resource category satisfying the resource allocation condition respectively in the above determining step 800, the executing body may generate the indication information for characterizing to approve the request. Here, the indication information for characterizing to approve the request, for example, may be True, i.e., the server may allow to approve the request. Then, the executing body may further perform resource allocation on each resource category of the request using the method for allocating a resource in the embodiment shown in FIG. 2. The resource allocation here performed for each target subserver.

In some alternative implementations of the present embodiment, when a total required quota corresponding to any resource category in the request fails to satisfy the resource allocation condition, the executing body may generate indication information for characterizing to intercept the request here, the indication information for characterizing to intercept the request, for example, may be False. For better illustration, a scenario shown in Table 1 may be referred to:

TABLE 1

|  | Globally available quota total limit | required quota (count) | Server output |
|---|---|---|---|
| Scenario I | resource A Quota = 5, Total limit = 20 | Count_A = 7 | True |
|  | resource A Quota = 5, Total limit = 20 | Count_A = 40 | False |

TABLE 1-continued

|  | Globally available quota total limit | required quota (count) | Server output |
|---|---|---|---|
| Scenario II | resource A Quota = 100, Total limit = 20 resource B Quota = 40, Total limit = 10 | Count_A = 40 Count_B = 40 | True |
|  | resource A Quota = 100, Total limit = 20 resource B Quota = 40, Total limit = 10 | Count_A = 80 Count_B = 80 | False |
| Scenario III | resource A Quota = 0, Total limit = 20 | Count_A = 3 | False |

As can be seen from FIG. 7, compared with the corresponding embodiment of FIG. 2, the process 700 of the method for allocating a resource in the present embodiment reflects the executing the determining step 800 on the total required quota matching each resource category in the request sent by the client side, the generating indication information for characterizing to approve the request in the case where the total required quota corresponding to each resource category satisfies the resource allocation condition, and the performing resource allocation on each resource category of the request respectively using the method for allocating a resource in the embodiment shown in FIG. 2. Accordingly, the scheme described in the present embodiment may determine the total required quota corresponding to each resource category in the request by introducing the globally available quota and the total limit, and perform resource allocation on the resource category in the request in the case where the total required quota corresponding to each resource category satisfies the resource allocation condition, thereby achieving reasonably utilizing the server resources, reducing the number of requests to the server on the premise of ensuring the access performance of the client side, and accelerating processing the request by the server.

Figure 9:
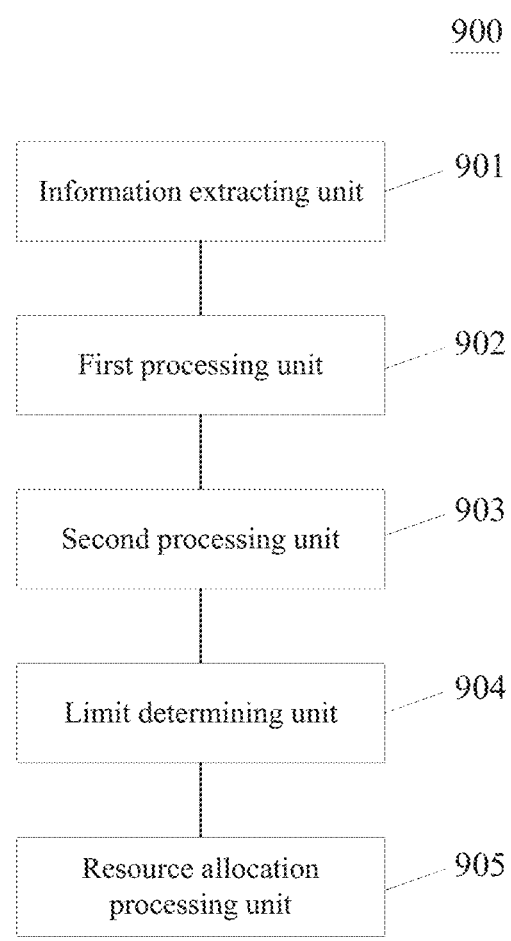
FIG. 9 is a schematic structural diagram of an apparatus for allocating a resource corresponding to the embodiment shown in FIG. 2 according to an embodiment of the present disclosure.

Further referring to FIG. 9, as an implementation of the method shown in the above figures, an embodiment of the present disclosure provides an apparatus for processing a resource. The embodiment of the apparatus corresponds to the embodiment of the method shown in FIG. 2. The apparatus may be specifically applied to various electronic devices.

As shown in FIG. 9, the apparatus 900 for allocating a resource according to the present embodiment includes an information extracting unit 901, a first processing unit 902, a second processing unit 903, a limit determining unit 904, and a resource allocation processing unit 905. The information extracting unit 901 is configured to extract a resource category matching a target subserver and a required quota corresponding to the resource category from a request sent by a client side; the first processing unit 902 is configured to determine the number of subservers in a subserver group receiving the request; the second processing unit 903 is configured to determine a globally available quota and a total limit matching the resource category; the limit determining unit 904 is configured to determine a limit matching the resource category in the target subserver based on the total limit and the number of subservers; and the resource allocation processing unit 905 is configured to perform resource allocation on the request for a resource quantity corresponding to the required quota based on comparison between the required quota and the limit.

The related description of step 201, step 202, step 203, step 204, and step 205 in the corresponding embodiment of FIG. 2 may be referred to for specific processing of the information extracting unit 901, the first processing unit 902, the second processing unit 903, the determining unit 904, and the resource allocation processing unit 905 of the apparatus 900 for allocating a resource and the technical effects thereof in the present embodiment, respectively. The description will not be repeated here.

In some alternative implementations of the present embodiment, the resource allocation processing unit 905 may be further configured to allocate, in response to the required quota being smaller than or equal to the limit, the resource quantity corresponding to the required quota for the request from a resource quantity corresponding to the limit.

In some alternative implementations of the present embodiment, the resource allocation processing unit 905 may include: a receiving module, and a first resource allocating module (not shown in the figure). The receiving module is configured to regularly receive a remaining limit sent by the target subserver after the required quota is allocated; and the first resource allocating module is configured to allocate the resource quantity corresponding to the required quota from a resource quantity corresponding to the globally available quota, to supplement a resource quantity corresponding to the remaining limit in the target subserver.

In some alternative implementations of the present embodiment, the resource allocation processing unit 905 may include: a second resource allocating module, and a recording module (not shown in the figure). The second resource allocating module is configured to allocate, in response to the required quota being greater than the limit, the resource quantity corresponding to the required quota for the request from the target subserver; and the recording module is configured to record the required quota in the target subserver.

In some alternative implementations of the present embodiment, the apparatus 900 for allocating a resource may further include a first information receiving unit, a first request receiving unit, and a third processing unit (not shown in the figure). The first information receiving unit is configured to receive the recorded required quota sent by the target subserver; the first request receiving unit is configured to receive a next request sent by the client side; and the third processing unit is configured to deduct, in response to receiving the next request, a resource quantity corresponding to the recorded required quota from the resource quantity corresponding to the globally available quota.

In some alternative implementations of the present embodiment, the apparatus 900 for allocating a resource may further include a timing unit, a second information receiving unit, and a fourth processing unit (not shown in the figure). The timing unit is configured to time a record cycle; the second information receiving unit is configured to receive the recorded required quota sent by the target subserver; and the fourth processing unit is configured to deduct, in response to the record cycle reaching a preset duration, the resource quantity corresponding to the required quota from the resource quantity corresponding to the globally available quota.

In some alternative implementations of the present embodiment, the apparatus 900 for allocating a resource may further include a comparing unit, and a quota updating unit (not shown in the figure). The comparing unit is configured to determine whether a current remaining quota of the globally available quota as smaller than the limit; and the quota updating unit is configured to update, in response to determining the current remaining quota of the globally available quota being smaller than the limit, a quota corresponding to the limit as the current remaining quota of the globally available quota.

The resource allocation processing unit 905 of the apparatus according to the above embodiments of the present disclosure performs, based on comparison between the required quota and the limit, resource allocation on the request for a resource quantity corresponding to the required quota, thereby reasonably allocating the resource quota and reasonably utilizing the server resources in a distributed environment. Allocating the locally available quota to the target, subserver and reasonably setting the resource quota may reduce the number of applications for the globally available quota, thus accelerating processing the request by the server.

Figure 10:
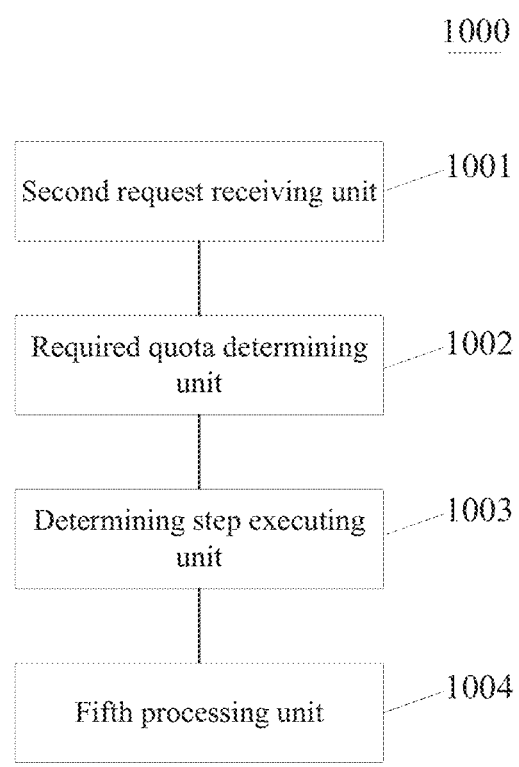
FIG. 10 is a schematic structural diagram of an apparatus for allocating a resource corresponding to the embodiment shown in FIG. 7 according to an embodiment of the present disclosure.

Further referring to FIG. 10, as an implementation of the method shown in the above figures, an embodiment of the present disclosure provides an apparatus for processing a resource. The embodiment of the apparatus corresponds to the embodiment of the method shown in FIG. 7. The apparatus may be specifically applied to various electronic devices.

As shown in FIG. 10, the apparatus 1000 for allocating a resource according to the present embodiment includes a second request receiving unit 1001, a required quota determining unit 1002, a determining step executing unit 1003, and a fifth processing unit 1004. The second request receiving unit 1001 is configured to receive a request sent by a client side, the request including: resource category information and a total required quota matching the resource category information; the required quota determining unit 1002 is configured to execute following determining steps on the total required quota matching the resource category information in the request: determining a globally available quota and a total limit matching the resource category information in the request; determining whether the globally available quota is greater than a preset value; summing the globally available quota and the total limit, in response to determining the globally available quota being greater than the preset value, to obtain a total quota; determining whether the total required quota is smaller than or equal to the total quota; and determining, in response to determining the total required quota being smaller than or equal to the total quota, the total required quota corresponding to the resource category information satisfying a resource allocation condition; the determining step executing unit 1003 is configured to execute the determining on a total required quota corresponding to each resource category in the request, to determine whether the total required quota corresponding to each resource category satisfies the resource allocation condition respectively; and the fifth processing unit 1004 is configured to generate, in response to determining the total required quota corresponding to the resource category satisfying the resource allocation condition respectively, indication information for characterizing to approve the request, and perform resource allocation on each resource category of the request respectively using the method in the embodiment shown in FIG. 2.

The related description of step 701, step 702, step 703, and step 704 in the corresponding embodiment of FIG. 2 may be referred to for specific processing of the second request receiving unit 1001, the required quota determining unit 1002, the determining step executing unit 1003, and the fifth processing unit 1004 of the apparatus 1000 for allocating a resource and the technical effects thereof in the present embodiment, respectively. The description will not be repeated here.

In some alternative implementations of the present embodiment, the apparatus 1000 for allocating a resource may further include an indication information generating unit not shown in the figure). The indication information generating unit may be configured to generate, in response to determining a total required quota corresponding to any resource category in the request failing to satisfy the resource allocation condition, indication information for characterizing to intercept the request.

The apparatus according to the above embodiments of the present disclosure may determine the total required quota corresponding to the information of each resource category in the request by the determining step executing unit 1003 by introducing the globally available quota and the total limit, and perform resource allocation on the resource category in the request by the fifth processing unit 1004 in the case where the total required quota corresponding to any resource category in the request satisfies the resource allocation condition, thereby achieving reasonably utilizing the server resources, reducing the number of times of requesting the server on the premise of ensuring the access performance of the client side, and accelerating processing the request by the server.

Figure 11:
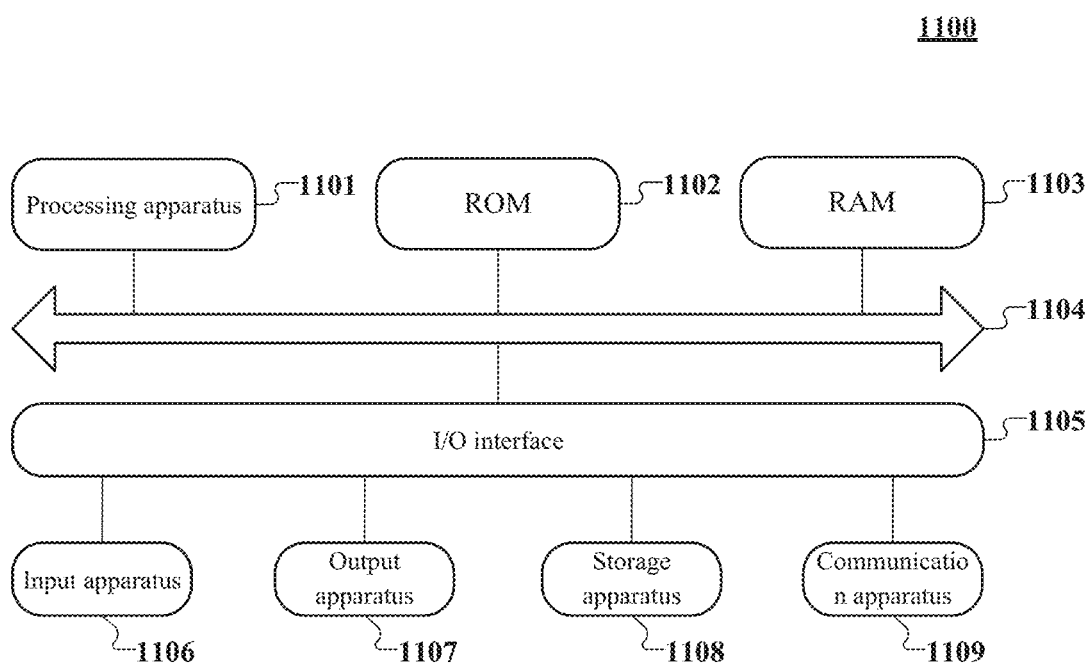
FIG. 11 is a schematic structural diagram adapted to implement an electronic device of some embodiments of the present disclosure.

Referring to FIG. 11 below, a schematic structural diagram of an electronic device (e.g., the server in FIG. 1) 1100 adapted to implement some embodiments of the present disclosure is shown. The server shown in FIG. 11 is merely an example, and should not impose any limitation on the functions and scope of use of embodiments of the present disclosure.

As shown in FIG. 11, the electronic device 1100 may include a processing apparatus (e.g., a central processor, or a graphics processor) 1101, which may execute various appropriate actions and processes in accordance with a program stored in a read only memory (ROM) 1102 or a program loaded into a random access memory (RAM) 1103 from a storage unit 1108. The RAM 1103 further stores various programs and data required by operations of the electronic device 1100. The processing apparatus 1101, the RCM 1102, and the RAM 1103 are connected to each other through a bus 1104. An input/output (I/O) interface 1105 is also connected to the bus 1104.

In general, the following apparatuses may be connected to the I/O interface 1105: an input apparatus 1106 including a touch screen, a touchpad, a keyboard, a mouse, a camera, a microphone, an accelerometer, a gyroscope, or the like; an output apparatus 1107 including a liquid crystal display (LCD), a speaker, a vibrator, or the like; and a communication apparatus 1109. The communication apparatus 1109 may allow the electronic device 1100 to exchange data with other devices through wireless or wired communication. While FIG. 11 shows the electronic device 1100 provided with various apparatuses, it should be understood that the electronic device is not required to implement or be provided with all of the shown apparatuses. More or fewer apparatuses may be alternatively implemented or provided. Each block shown in FIG. 11 may represent an apparatus, or represent a plurality of apparatuses as required.

In particular, according to some embodiments of the present disclosure, the process described above with reference to the flow chart may be implemented in a computer software program. For example, some embodiments of the present disclosure include a computer program product, which includes a computer program that is tangibly embedded a computer readable medium. The computer program includes program codes for executing the method as shown in the flow chart. In such an embodiment, the computer program may be downloaded and installed from a network via the communication apparatus 1109, or be installed from the storage apparatus 1108, or be installed from the ROM 1102. The computer program, when executed by the processing apparatus 1101, implements the above functions defined by the method of some embodiments of the present disclosure.

It should be noted that the computer readable medium of some embodiments of the present disclosure may be a computer readable signal medium or a computer readable storage medium, or any combination of the above two. An example of the computer readable storage medium may include, but is not limited to: electric, magnetic, optical, electromagnetic, infrared, semiconductor systems, apparatuses, elements, or a combination of any of the above. A more specific example of the computer readable storage medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable storage medium may be any tangible medium containing or storing programs which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable signal medium is capable of transmitting, propagating or transferring programs for use by, or use in combination with, a command execution system, apparatus or element. The program codes contained on the computer readable medium may be transmitted with any suitable medium, including but not limited to: wire, optical cable, RF (radio frequency) medium etc., or any suitable combination of the above.

The above computer readable medium may be included in the above electronic device; or a stand-alone computer readable medium without being assembled into the server. The above computer readable medium stores one or more programs. The one or more programs, when executed by the server, cause the server to: extract a resource category matching a target subserver and a required quota corresponding to the resource category from a request sent by a client side; determine the number of subservers in a subserver group receiving the request; determine a globally available quota and a total limit matching the resource category; determine a limit matching the resource category in the target subserver based on the total limit and the number of subservers; and perform resource allocation for a resource quantity corresponding to the required quota of the request based on a comparison between the required quota and the limit of the target subserver.

A computer program code for executing operations in some embodiments of the present disclosure may be compiled using one or more programming languages or combinations thereof. The programming languages include object-oriented programming languages, such as Java, Smalltalk, or C++, and also include conventional procedural programming languages, such as "C" language, or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer via any network, including a local area network (LAN) or wide area network (WAN), or be connected to an external computer (for example, connected via the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or sometimes be executed in a reverse sequence, depending on the functions involved. It should be further noted that each bock in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software or hardware. The described units may also be provided in a processor, for example, described as: a processor including an information extracting unit, a first processing unit, a second processing unit, a limit determining unit, and a resource allocation processing unit. The names of the units do not constitute a limitation to such units themselves in some cases. For example, the information extracting unit may be further described as "a unit configured to process information."

The above description only provides explanation of the preferred embodiments and the employed technical principles of the present disclosure. It should be appreciated by those skilled in the art that the inventive scope involved in embodiments of the present disclosure is not limited to the technical solutions formed by the particular combinations of the above-described technical features. The inventive scope should also cover other technical solutions formed by any combination of the above-described technical features or equivalent features thereof without departing from the inventive concept of the present disclosure, for example, technical solutions formed by interchanging the above-described features with, but not limited to, technical features with similar functions disclosed in some embodiments of the present disclosure.

What is claimed is:

1. A method for allocating a resource, the method comprising:
    extracting a resource category matching a target subserver and a required quota corresponding to the resource category from a request sent by a client side;
    determining a number of subservers in a subserver group receiving the request;
    determining a globally available quota and a total limit matching the resource category;
    determining a limit matching the resource category in the target subserver based on the total limit and the number of sub servers;
    performing resource allocation for a resource quantity corresponding to the required quota of the request based on a comparison between the required quota and the limit of the target subserver;
    determining that a current quota of the globally available quota is smaller than the limit of the target subserver, wherein the globally available quota is a shared quota available for a plurality of subservers in the subserver group, and the limit of the target subserver is a local available quota in the target subserver; and
    decreasing the limit of the target subserver to a value equal to the current quota of the globally available quota, in response to determining that the current quota of the globally available quota is smaller than the limit of the target subserver.

2. The method according to claim 1, wherein the performing resource allocation for a resource quantity corresponding to the required quota of the request based on a comparison between the required quota and the limit of the target subserver comprises:
    allocating, in response to the required quota being smaller than or equal to the limit of the target subserver, the resource quantity corresponding to the required quota of the request from a resource quantity corresponding to the limit of the target subserver.

3. The method according to claim 2, wherein after the allocating the resource quantity corresponding to the required quota of the request from a resource quantity corresponding to the limit, the method further comprises:
    regularly receiving a remaining limit sent by the target subserver after the required quota is allocated; and
    allocating the resource quantity corresponding to the required quota from a resource quantity corresponding to the globally available quota, to supplement a resource quantity corresponding to the remaining limit in the target sub server.

4. The method according to claim 1, wherein the performing resource allocation for a resource quantity corresponding to the required quota of the request based on a comparison between the required quota and the limit of the target subserver comprises:
    allocating, in response to the required quota being greater than the limit of the target server, the resource quantity corresponding to the required quota of the request from the target sub server; and
    recording the required quota in the target sub server.

5. The method according to claim 4, wherein after the recording the required quota in the target subserver, the method further comprises:
    receiving the recorded required quota sent by the target sub server;
    receiving a next request sent by the client side; and
    deducting, in response to receiving the next request, a resource quantity corresponding to the recorded required quota from the resource quantity corresponding to the globally available quota.

6. The method according to claim 4, wherein after the recording the required quota in the target subserver, the method further comprises:
  timing a record cycle;
  receiving the recorded required quota sent by the target sub server; and
  deducting, in response to the record cycle reaching a preset duration, the resource quantity corresponding to the required quota from the resource quantity corresponding to the globally available quota.

7. The method for allocating a resource according to claim 1, the method further comprising:
  receiving the request sent by the client side, the request comprising: the resource category and a total required quota matching the resource category;
  executing following determining steps on the total required quota matching the resource category in the request: determining a globally available quota and a total limit matching the resource category in the request; determining whether the globally available quota is greater than a preset value; summing the globally available quota and the total limit, in response to determining the globally available quota being greater than the preset value, to obtain a total quota; determining whether the total required quota is smaller than or equal to the total quota; and determining, in response to determining the total required quota being smaller than or equal to the total quota, that the total required quota corresponding to the resource category satisfies a resource allocation condition;
  executing the determining steps on a total required quota corresponding to each resource category in the request, to determine whether the total required quota corresponding to the each resource category satisfies the resource allocation condition respectively; and
  generating, in response to determining that the total required quota corresponding to each resource category satisfies the resource allocation condition respectively, indication information for characterizing to approve the request, and performing the resource allocation on the each resource category of the request respectively.

8. The method according to claim 7, wherein the method further comprises:
  generating, in response to determining a total required quota corresponding to any resource category in the request failing to satisfy the resource allocation condition, indication information for characterizing to intercept the request.

9. An apparatus for allocating a resource, comprising:
  at least one processor; and
  a memory storing instructions, wherein the instructions when executed by the at least one processor, cause the at least one processor to perform operations, the operations comprising:
  extracting a resource category matching a target sub server and a required quota corresponding to the resource category from a request sent by a client side;
  determining a number of sub servers in a sub server group receiving the request;
  determining a globally available quota and a total limit matching the resource category;
  determining a limit matching the resource category in the target subserver based on the total limit and the number of sub servers;
  performing resource allocation for a resource quantity corresponding to the required quota of the request based on a comparison between the required quota and the limit of the target subserver;
  determining that a current quota of the globally available quota is smaller than the limit of the target subserver, wherein the globally available quota is a shared quota available for a plurality of subservers in the subserver group, and the limit of the target subserver is a local available quota in the target subserver; and
  decreasing the limit of the target subserver to a value equal to the current quota of the globally available quota, in response to determining that the current quota of the globally available quota is smaller than the limit of the target subserver.

10. The apparatus according to claim 9, wherein the performing resource allocation for a resource quantity corresponding to the required quota of the request based on a comparison between the required quota and the limit of the target subserver comprises:
  allocating, in response to the required quota being smaller than or equal to the limit of the target subserver, the resource quantity corresponding to the required quota of the request from a resource quantity corresponding to the limit of the target subserver.

11. The apparatus according to claim 10, wherein the operations further comprise:
  regularly receiving a remaining limit sent by the target subserver after the required quota is allocated; and
  allocating the resource quantity corresponding to the required quota from a resource quantity corresponding to the globally available quota, to supplement a resource quantity corresponding to the remaining limit in the target sub server.

12. The apparatus according to claim 9, wherein the performing resource allocation for a resource quantity corresponding to the required quota of the request based on a comparison between the required quota and the limit of the target subserver comprises:
  allocating, in response to the required quota being greater than the limit of the target server, the resource quantity corresponding to the required quota for the request from the target sub server; and
  recording the required quota in the target sub server.

13. The apparatus according to claim 12, wherein the operations further comprise:
  receiving the recorded required quota sent by the target sub server;
  receiving a next request sent by the client side; and
  deducting, in response to receiving the next request, a resource quantity corresponding to the recorded required quota from the resource quantity corresponding to the globally available quota.

14. The apparatus according to claim 12, wherein the operations further comprise:
  timing a record cycle;
  receiving the recorded required quota sent by the target sub server; and
  deducting, in response to the record cycle reaching a preset duration, the resource quantity corresponding to the required quota from the resource quantity corresponding to the globally available quota.

15. The apparatus for allocating a resource according to claim 9, wherein the operations further comprise:
  receiving the request sent by the client side, the request comprising: the resource category and a total required quota matching the resource category;
  executing following determining steps on the total required quota matching the resource category in the request: determining a globally available quota and a total limit matching the resource category information in the request; determining whether the globally available quota is greater than a preset value; summing the globally available quota and the total limit, in response to determining the globally available quota being greater than the preset value, to obtain a total quota; determining whether the total required quota is smaller than or equal to the total quota; and determining, in response to determining the total required quota being smaller than or equal to the total quota, that the total required quota corresponding to the resource category satisfies a resource allocation condition;

executing the determining steps on a total required quota corresponding to each resource category in the request, to determine whether the total required quota corresponding to the each resource category satisfies the resource allocation condition respectively; and generating, in response to determining that the total required quota corresponding to each resource category satisfies the resource allocation condition respectively, indication information for characterizing to approve the request, and perform the resource allocation on the each resource category of the request respectively.

16. The apparatus according to claim 15, wherein the operations further comprise:

generating, in response to determining a total required quota corresponding to any resource category in the request failing to satisfy the resource allocation condition, indication information for characterizing to intercept the request.

17. A non-transitory computer readable medium, storing a computer program thereon, wherein the program, when executed by a processor, causes the processor to perform operations, the operations comprising:

extracting a resource category matching a target sub server and a required quota corresponding to the resource category from a request sent by a client side;

determining a number of sub servers in a sub server group receiving the request;

determining a globally available quota and a total limit matching the resource category;

determining a limit matching the resource category in the target subserver based on the total limit and the number of sub servers;

performing resource allocation for a resource quantity corresponding to the required quota of the request based on a comparison between the required quota and the limit of the target sub server; and determining that a current quota of the globally available quota is smaller than the limit of the target subserver, wherein the globally available quota is a shared quota available for a plurality of subservers in the subserver group, and the limit of the target subserver is a local available quota in the target subserver; and decreasing the limit of the target subserver to a value equal to the current quota of the globally available quota, in response to determining that the current quota of the globally available quota is smaller than the limit of the target subserver.

* * * * *